Oct. 22, 1929.  C. LOFMAN  1,732,652
TIE
Filed Feb. 18, 1925
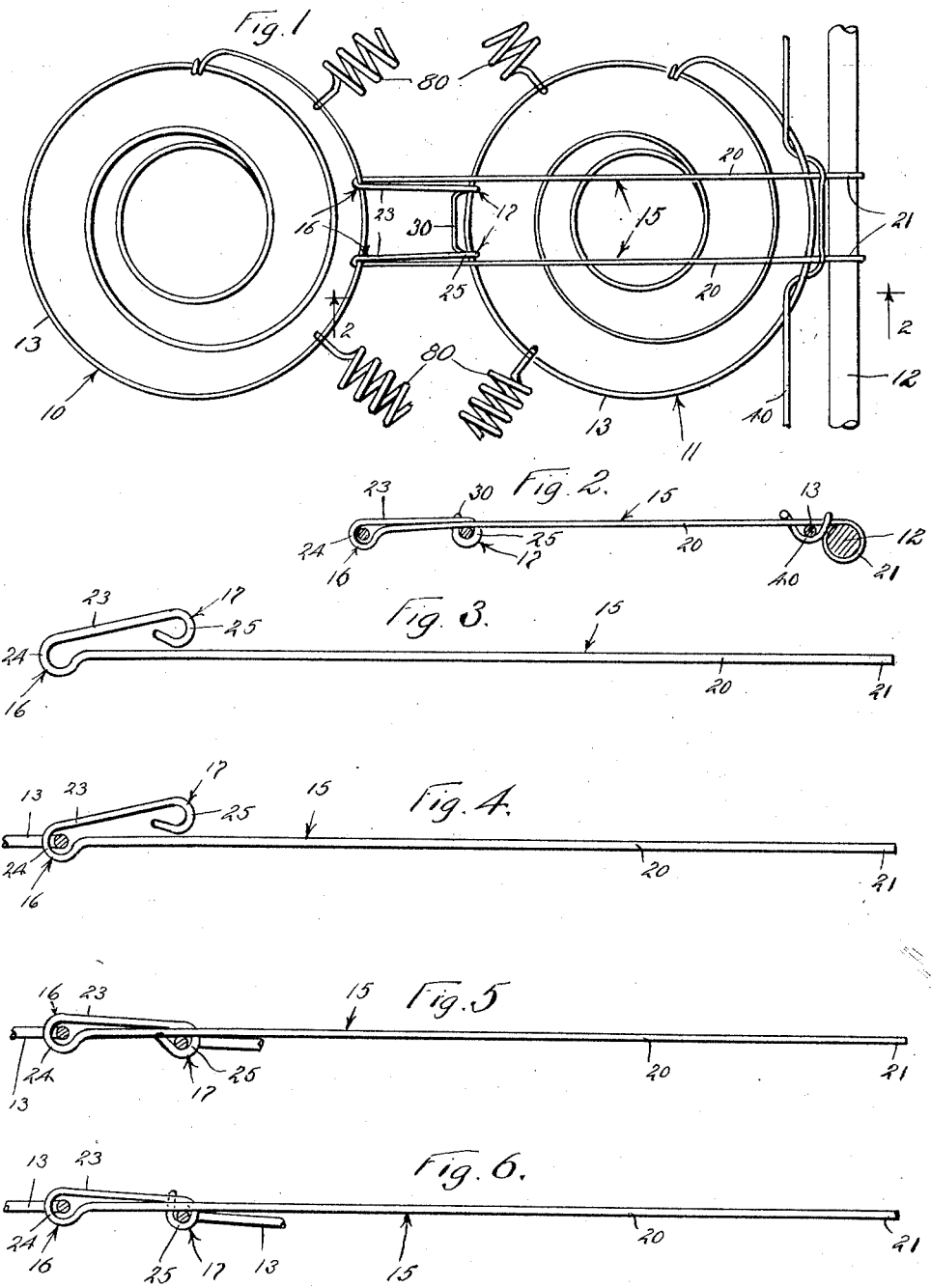
Inventor
Charles Lofman
by W. W. Maxwell
his Attorney Patented Oct. 22, 1929

1,732,652

UNITED STATES PATENT OFFICE

CHARLES LOFMAN, OF LOS ANGELES, CALIFORNIA, ASSIGNOR TO LOS ANGELES SPRING BED COMPANY, OF LOS ANGELES, CALIFORNIA, A CORPORATION OF OHIO

TIE

Application filed February 18, 1925. Serial No. 9,951.

This invention has to do with a construction applicable generally to bed springs, spring cushions, etc.

My invention has particular reference to a tie for securing springs such as are usually employed in bed springs, spring cushions, seats, etc., to a frame member, or the like; it being a general object of the invention to provide a simple effective tie of this character.

A particular object of my invention is to provide a tie of the general character herein set forth which is simple and convenient to apply and which is effective and secure.

It is a further object of my invention to provide a tie which is effective in connecting a plurality of springs with a frame so that the springs are effectively held in place and are at the same time free to work or operate in the desired manner.

The various objects and features of my invention will be best and more fully understood from the following detailed description of a typical form and application of the invention, throughout which description reference is had to the accompanying drawings in which Fig. 1 is a plan view of two typical springs such as are employed in the construction of bed springs and a part of a frame, the springs and frame being connected together by the tie provided by my invention.

Fig. 2 is a transverse sectional view taken as indicated by line 2—2 on Fig. 1.

Fig. 3 is a side elevation of my tie showing it as it appears before being applied to the springs and frame and Figs. 4, 5 and 6 are views similar to Fig. 3 illustrating various steps in the application of the tie to the springs.

My invention in its broader aspects is applicable, generally, to various constructions, such for instance, as seats, cushions, or bed spring constructions in which a plurality of springs are to be tied together or are to be tied together and to a frame member, or the like. For the purpose of facilitating a full understanding of my invention I have herein set forth one typical form and application of the invention and have chosen to disclose the invention as applied to two helical springs 10 and 11 and a frame member 12. The springs 10 and 11 are tapered helical springs such as are commonly employed in spring cushions, bed springs, and like constructions. In accordance with standard practice these springs are provided at their upper ends with ring like parts 13 which will be the parts to which my tie will be applied, it being understood, of course, that the invention is not specifically limited to the ties being attached to these or any other specific parts, it being obvious that they may be applied to the lower ends of the springs as well as the upper ends of the springs if circumstances so require. In the arrangement illustrated in Fig. 1, which arrangement is that commonly found in bed spring constructions, the spring 11, which I will term the outer spring, is arranged adjacent the frame 12 while the spring 10, which I will term the inner spring, is spaced somewhat from the outer spring at the side opposite the frame 12 so that the outer spring is located between the inner spring 10 and frame 12. The springs 11 and 10 are connected with the other like springs of the construction by crossed springs 80 such as are commonly found in constructions of this type. Frame 12 is for purpose of example illustrated in the form of a rod, it being understood, of course, that my invention is not concerned with the formation or construction of this part.

The tie provided by this invention includes, generally, an elongate body 15, adapted to extend between the springs 10 and 11 and the frame member 12, and two oppositely disposed hook parts 16 and 17 at the inner end of the body, one hook part being adapted to receive and hold the ring like part 13 of one of the springs and the other hook part being adapted to receive the ring like part of the other spring. The hook parts 16 and 17 are arranged in spaced relation so that they hold the springs 10 and 11 in the desired spaced relation and are disposed so that they will hold the ring like parts of the springs in a common plane, which I will refer to as a horizontal plane. The hook part 16 is at the extreme inner end of the body and faces outwardly or toward the frame member 12 while the hook part 17 is spaced somewhat from the inner end of the body and is faced inwardly or toward the hook parts 16. In accordance with my invention the hook part 17 is formed at or on the end of the free or projecting part of the hook 16.

In accordance with my invention the tie which I am about to describe is formed of a single member such, for instance, as a single piece of wire of the proper gauge and characteristics. The body 15 of the tie comprises two spaced substantially parallel parts 20 which extend from one end of the tie to the other. At the outer end of the tie, or in other words, at the frame part 12, the body parts 20 may be secured or connected to a suitable part, for instance, the frame part 12, by looping their ends 21 around the frame part 12 in the manner clearly illustrated in Figs. 1 and 2 of the drawings. The outwardly facing hook 16 at the extreme inner end of the tie includes outer bills 23 which project outwardly and loop parts 24 which join the free parts and the inner ends of the body parts 20. The loop parts 24 are shaped and proportioned to carry the ring like part 13 of one of the springs. The bills 23 project outwardly from the extreme inner end of the tie and are provided at their outer ends with looped parts 25 which form the hook 17. The loop parts 25 are turned or formed to face inwardly or toward the loop parts 24. The ends of the loop parts 25 are connected by a transverse connecting part 30. In the preferred form of construction the loop parts 24 and 25 are disposed vertically or in other words are formed on horizontal axes, the loop parts 24 being formed by bending the wire at the inner ends of the body parts 20 upwardly and forwardly while the loop parts 25 are formed by bending the wire at the outer ends of the bills 23 downwardly and rearwardly or toward the inner end of the tie. In practice the bills 23 converge somewhat as they extend toward the outer end of the tie so that the loop parts 25 are within the body parts 20 so that they are free to pass between the body parts. The tie is bent up or formed so that the bills 23 normally extend somewhat upwardly and outwardly causing the loop parts 25 to be above the plane of the body parts 20, it being preferred to proportion the parts so that the loop parts 25 are spaced far enough above the body parts 20 to allow the ring like part 13 of one of the springs, for instance, of the inner spring 10 to be conveniently passed between the loop parts 25 and body parts 20 to position in the loop parts 24 as shown in Fig. 4 of the drawings. In practice the passing of the ring like part 13 of the inner spring 10 into the loop parts 24 is the first operation in applying the tie to the springs and frame. To apply the tie to the second or outer spring 11, the bills 23, or the loop parts 25, are depressed to pass downwardly between the body parts 20 until the open parts of the loops are far enough below the body parts 20 to allow the ring like part 13 of the outer spring 11 to be passed into the loop parts 25 under the body parts 20. When the ring like part 13 of the spring 11 has been passed into the loops 25 the parts may be released so that the resiliency of the wire or the tendency for the parts to return to their normal position as shown in Fig. 3 causes the part 13 of the spring 11 to be tightly held between the loop parts 25 and body parts 20 as shown in Fig. 5. It is to be noted that the depression of the bills 23 to the position shown in Fig. 5 causes the parts 23 to close toward the body parts in a manner to close the loop parts 24 and prevent displacement of the ring like part 13 of the spring 10 therefrom. To finish the tie so that it cannot be disengaged without distortion I prefer to bend the outer ends of the loops 25 and the connecting member 30 in a manner to close the loops 25 as shown in Fig. 6. This may be done by applying a suitable tool to the connecting part 30 and to that portion of the ring like part 13 of the spring 11 which is carried between the loop parts 25. When the tie is thus completely applied to the springs the connecting part 30 is in position to hold the body parts 20 in the proper spaced relation.

With the springs 10 and 11 connected as hereinabove described, the outer ends of the body parts 20 may be applied to the frame member 12 and if desired a border wire 40, or the like, may be applied to connect the body parts of the tie and the ring like part 13 of the outer spring 11 adjacent the frame member 12 in the manner illustrated in Fig. 1 of the drawings. With ordinary constructions it is usually necessary to apply a second wire similar to the wire 40 at a point between the springs 10 and 11 to properly brace the springs and to hold the tie in place. My tie braces the springs so that this second wire is not necessary.

From the foregoing description it will be obvious how the tie which I have provided may be economically formed from wire, each tie requiring a single piece of wire, and how the construction and relationing of the various parts of the tie permit of its being very quickly and conveniently applied to the springs to connect them. When the tie is applied as I have shown throughout the drawings, it is particularly effective in holding the springs in proper alignment or relationing relative to the frame member, at the same time allowing pivotal movement between the springs giving the desired flexibility to the construction. It is to be particularly noted that the tie when applied as shown in the drawings holds the outer spring, that is the spring adjacent the frame member in a particularly secure and firm manner giving the border portion of the construction more or less firmness or rigidity which is highly desirable.

Having described only a typical preferred form of my invention I do not wish to limit myself to the specific details hereinabove set forth, but wish to reserve to myself any changes or variations that may appear to those skilled in the art or fall within the scope of the following claims.

Having described my invention, I claim:

1. In combination, two springs, a frame, and a tie connecting the two springs and the frame, said tie including a single wire having two spaced body parts extending between a part of the frame and a part of one of the springs and being horizontally disposed over one of the springs, a hook part at one end of the body parts connecting the body parts and extending a substantial distance around a portion of one of the springs holding it against movement with reference to the other spring, a second hook part on the free end of the first mentioned hook extending a substantial distance around the said other spring holding it in spaced relation to the spring held by the first-mentioned hook part, the other end of the body parts being attached to the frame.

2. In combination, a frame, an inner spring, an outer spring, and a tie connecting the springs and the frame, said tie including a single wire having two spaced body parts extending between the frame and a portion of the inner spring and extending over and engaging the top of the outer spring at opposite points, a hook part connecting the inner ends of the body parts and extending a substantial distance around a portion of the inner spring and a substantial distance around a portion of the outer spring holding the two springs in spaced relationship, the outer ends of the body parts being connected to the frame.

3. In combination, a frame, an outer coiled spring, an inner coiled spring, and a tie connecting the springs and the frame, said tie including a single wire having two spaced parallel body parts connected to the frame and extending over and engaging the top of the outer coiled spring and extending to the inner coiled spring and a hook connecting the body parts at their inner ends and extending a substantial distance around a portion of the inner spring and having parts extending a substantial distance around a portion of the outer spring holding the springs in spaced relation.

4. In combination, a frame, an inner coiled spring, an outer coiled spring, and a tie connecting the two springs and the frame, said tie including a single wire having two spaced body parts engaging the top of the outer spring holding it against upward movement, the tie having parts at the outer ends of the body parts extending around a portion of the frame and having a hook part connecting the inner ends of the body parts and extending under and then over a part of the inner spring.

In witness that I claim the foregoing I have hereunto subscribed my name this 24th day of January, 1925.

CHARLES LOFMAN.